United States Patent Office 2,740,786
Patented Apr. 3, 1956

2,740,786
LACTAM OF N(β-AMINOETHYL) CHELIDAMIC ACID

Arthur W. Schwab, Peoria, Ill., assignor to the United States of America as represented by the Secretary of Agriculture No Drawing. Application June 20, 1955, Serial No. 516,807

1 Claim. (Cl. 260—268)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a new chemical compound, a pyridopiperazine derivative having a novel basic ring system. More particularly, the invention relates to the lactam of N(β-aminoethyl) chelidamic acid, the basic ring system of which, according to the azabicycloalkane-system of nomenclature, is designated 1,4-diazabicyclo (4.4.0) decane.

The compound has the following structural formula:

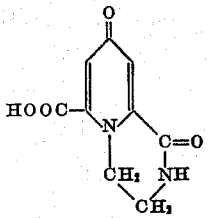

Generally the compound may be synthesized in two steps. Ethylenediamine is added to chelidonic acid to produce the amine salt. The salt is then treated in aqueous solution with mineral acid, and the lactam separates as a precipitate. Its unique ring structure renders the novel compound of considerable interest as an intermediate for pharmaceuticals.

The compound is also useful in increasing the oxidative stability of vegetable oils. For example, 0.01 percent, based on the weight of soybean oil, will hold the 8-hour A. O. M. peroxide value to 18.0 in comparison with a value of 31.8 for untreated oil. It is also effective in the presence of added copper or iron, holding the peroxide values to approximately half those reached in control oils containing added copper or iron.

The following specific examples illustrate the invention:

Experimental

*Ethylenediamine chelidonic acid salt.*—Seven grams of chelidonic acid are dissolved in hot, absolute ethanol. While under reflux, 7.0 g. of ethylenediamine (95%) are added dropwise. Upon addition of the first drop of ethyldiamine, a precipitate settles out. The insoluble compound continues to form as additional ethylenediamine is added. The solution is allowed to reflux for 2 hours. It is then cooled, and the insoluble product is filtered off. Recrystallization from water produces large colorless needles. These needles are filtered off and then dried over $P_2O_5$ in a vacuum desiccator. The yield is approximately 4.0 g. The melting point is 239–240° (decomp.). The salt is neutral to pH indicator paper. It is hydroscopic. Additional quantities of the salt are obtained from concentrating the filtrates. Analysis shows the compound to have the composition of equimolar amounts of chelidonic acid and ethylenediamine.

*Analysis.*—Calcd. for $C_9H_{12}O_6N_2$: C, 44.3; H, 4.92; N, 11.5. Found: C, 44.2; H, 4.92; N, 11.7.

*Lactam of N(β-aminoethyl) chelidamic acid.*—When a saturated aqueous solution of the ethylenediamine salt of chelidonic acid is treated with dilute hydrochloric acid, an insoluble precipitate settles out. This precipitate is filtered and washed with ice water. It is dried over $P_2O_5$ in a vacuum desiccator. This compound does not melt below 300°. It is acid to pH paper and has a neutral equivalent of 208 (theory 208). The ultraviolet absorption spectra of a 0.00012 M solution of this compound in 0.01N NaOH showed a peak at 232 mμ with ε 19,000 and a shallow peak at 272 mμ with ε 7700.

*Analysis.*—Calcd. for $C_9H_8O_4N_2$: C, 51.9; H, 3.85; N, 13.5. Found: C, 51.1; H, 3.93; N, 13.4.

The p-bromophenacyl derivative crystallizes with 2 molecules of water and melts at 172–4° with charring.

*Analysis.*—Calcd. for $C_{17}H_{13}O_5N_2Br$: C, 50.4; H, 3.21; N, 6.91; Br, 19.75. Found: C, 50.3; H, 3.25; N, 6.79; Br, 20.1.

This application is a continuation-in-part of application Serial No. 388,464, filed October 26, 1953.

I claim:

The lactam of N(β-aminoethyl) chelidamic acid having the following structural formula:

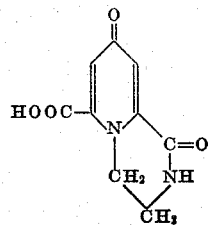

No references cited.